(12) United States Patent
Souma et al.

(10) Patent No.: US 8,303,015 B2
(45) Date of Patent: Nov. 6, 2012

(54) LOWER STRUCTURE OF VEHICLE BODY REAR PORTION

(75) Inventors: Takayuki Souma, Hamamatsu (JP); Norio Nishida, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 45 days.

(21) Appl. No.: 12/974,316

(22) Filed: Dec. 21, 2010

(65) Prior Publication Data
US 2011/0156431 A1    Jun. 30, 2011

(30) Foreign Application Priority Data
Dec. 24, 2009   (JP) ................................. 2009-292489

(51) Int. Cl.
*B60J 7/00*      (2006.01)
(52) U.S. Cl. .................................. 296/37.2; 296/187.11
(58) Field of Classification Search .................. 296/37.2, 296/187.11
See application file for complete search history.

(56) References Cited

U.S. PATENT DOCUMENTS
7,380,856 B2 *   6/2008   Kobayashi et al. ........... 296/37.2
7,677,651 B2 *   3/2010   Yamaguchi et al. ...... 296/203.04

FOREIGN PATENT DOCUMENTS
| JP | 10-316050 A | 12/1998 |
| JP | 2007-276605 A | 10/2007 |
| JP | 2009-179181 A | 8/2009 |

* cited by examiner

*Primary Examiner* — Joseph Pape
(74) *Attorney, Agent, or Firm* — Alston & Bird LLP

(57) ABSTRACT

A lower structure of a vehicle body rear portion, includes: a spare tire housing formed in a rear floor; a cross member joining paired side frames, and being provided at a location frontward of the housing; a reinforcement for a hook, being arranged at a center of the housing; and a bumper member provided at a rear end of the vehicle body, in which a front side of the reinforcement is attached to the cross member, the reinforcement forms a closed cross section so that the closed cross section is larger at a rear side than at a front side, the reinforcement includes front and rear portions obtained by dividing the reinforcement at a location corresponding to a center of a spare tire, and an upper side of a rear end of the rear portion is arranged below the bumper member and overlaps with the bumper member (FIG. 2).

4 Claims, 5 Drawing Sheets

LOWER STRUCTURE OF VEHICLE BODY REAR PORTION

FIELD OF THE INVENTION

The present invention relates to a lower structure of a vehicle body rear portion, the lower structure being located around a spare tire housing which is formed in a rear floor of the vehicle body rear portion.

BACKGROUND OF THE INVENTION

In typical vehicles, a spare tire housing for housing a spare tire is provided at a rear floor in a vehicle body rear portion. When such a vehicle receives a load from a rear side, the front end of the spare tire moves forward, so that the spare tire housing, which houses the spare tire, is sometimes deformed forward, and it is also displaced forward. Because, in particular, a fuel tank is often arranged forward of the spare tire housing, the deformed spare tire housing may possibly come into contact with the fuel tank. Therefore, such deformation and displacement are unfavorable.

One possible countermeasure against such a possibility is to ensure sufficient space between the spare tire housing and a back panel at the vehicle body rear end, so that the load can be absorbed around the spare tire housing. In addition, in the case in which the fuel tank is arranged forward of the spare tire housing, another possible countermeasure is to ensure sufficient space between the spare tire housing and the fuel tank, so that the load can be absorbed around the spare tire housing. However, it is necessary to ensure space to arrange components other than the spare tire housing and the fuel tank. There are many limitations in the layout of body components as well. Therefore, in many cases, it is unlikely to be able to ensure sufficient space between the spare tire housing and the back panel on the vehicle body rear end, sufficient space between the spare tire housing and the fuel tank, and the like. Furthermore, if there is sufficient space between the spare tire housing and the back panel at the vehicle body rear end, sufficient space between the spare tire housing and the fuel tank, and the like are ensured, but there is a problem in that the vehicle body increases in size. This problem is more serious, in particular, for small vehicles.

In addition, when a load is applied to the vehicle from a rear side, the front end of the spare tire sometimes moves upward and forward. In this case, since rear seats are often arranged at locations forward of and above the spare tire housing, the front end of the spare tire may come into contact with the rear seats, and this is undesirable.

In this respect, Japanese Unexamined Patent Publication No. 10-316050 discloses a structure to prevent the forward displacement of a spare tire, the forward deformation, and displacement of a spare tire housing, as well as the contact of the spare tire housing with a fuel tank. In the structure, the spare tire is housed within the spare tire housing in an inclined orientation with a front side thereof arranged above the arrangement location of a fuel tank.

In addition, Japanese Unexamined Patent Publication No. 2007-276605 discloses a structure to prevent the forward displacement of a spare tire, the forward deformation, and displacement of a spare tire housing, and also to prevent the contact of the spare tire housing with a fuel tank, the upward and forward displacement of the front end of the spare tire, and the contact of the front end of the spare tire with rear seats. In the structure, the spare tire is housed within the spare tire housing in an inclined orientation with a front side thereof arranged above the arrangement location of a fuel tank, and a frangible portion is provided to a rear side of a spare tire bracket to which the center of the spare tire is to be attached. According to this structure, when a load is applied to the vehicle from a rear side, the spare tire bracket is bent on this frangible portion, and therefore the spare tire turns while further lifting up the front side thereof. As a result, the spare tire comes to incline more steeply.

Furthermore, Japanese Unexamined Patent Publication No. 2009-179181 discloses a structure configured such that a spare tire is arranged within a spare tire housing in an inclined orientation while a front end thereof is down, and that a rear portion of the spare tire is tipped up to vertically turn around the front end of the spare tire toward a front side of the vehicle when receiving a load from a rear side of the vehicle. This reduces the load which the front end of the spare tire applies to a structure in front thereof.

BRIEF SUMMARY OF THE INVENTION

However, Japanese Unexamined Patent Publication No. 10-316050 mentioned above merely discloses a configuration to house a spare tire within a spare tire housing in an inclined orientation with a front side thereof arranged above the arrangement location of a fuel tank. Therefore, when a load is applied to the vehicle from a rear side, the front end of the spare tire is likely to move upward and forward. There still remains a possibility that the front end of the spare tire will come into contact with the rear seats.

In the case of Japanese Unexamined Patent Publication No. 2007-276605, since the frangible portion is provided to the spare tire bracket to which the spare tire is attached, the spare tire readily vibrates with the frangible portion as a source of the vibration while the vehicle is running or doing the like. Since the vibration of the spare tire produces noise and also makes the spare tire bracket easy to break due to vibration fatigue, this may appear to be problematic.

Furthermore, it is conceivable to increase the angle at which the spare tire inclines to facilitate the vertical turning as described in Japanese Unexamined Patent Publication No. 2009-179181. The increase in angle, however, causes a problem in that the luggage space is made smaller in the vertical direction.

The present invention has been made in view of the above circumstances, and it has as an object to provide a lower structure of a vehicle body rear portion capable of preventing the generation of vibration of a spare tire while the vehicle is running, and, in a case in which a load is applied to the vehicle from a rear side, preventing the forward displacement of the spare tire, upward and the forward displacement of the spare tire, the forward deformation of the spare tire housing, and forward displacement of the spare tire housing.

In order to solve the above problems, a lower structure of a vehicle body rear portion according to the present invention includes: a spare tire housing formed in a rear floor of the vehicle body rear portion; a rear cross member which joins paired side frames located respectively on a left side and a right side of a vehicle width direction, and which is provided on a location frontward of the spare tire housing; a hook reinforcement for a tow hook, the hook reinforcement extending in a vehicle front and rear direction and arranged at a center, in the vehicle width direction, of a bottom surface of the spare tire housing; and a bumper member provided at a rear end of a vehicle body, wherein a front side of the hook reinforcement is attached to the rear cross member; wherein the hook reinforcement forms a closed cross section in cooperation with the rear floor and is formed such that the closed cross section is larger at a rear side than at a front side; the hook reinforcement includes a reinforcement front portion and a reinforcement rear portion which are obtained by dividing the reinforcement at a location corresponding to a center location of a spare tire housed within the spare tire housing, and an upper side of a rear end of the reinforcement rear portion is arranged below the bumper member and overlaps with the bumper member.

Regarding the lower structure of the vehicle body rear portion according to the present invention, the upper side of the rear end of the reinforcement rear portion protrudes farther toward a rear side of the vehicle than a lower side of the rear end of the reinforcement rear portion, the tow hook is attached to the lower side of the rear end of the reinforcement rear portion, and a rear end of the tow hook is arranged at a location, in a front and rear direction, corresponding to or rearward of a back panel on the rear end of the vehicle body.

Regarding the lower structure of the vehicle body rear portion according to the present invention, a spare tire bracket to hold the spare tire is provided to a top surface of the spare tire housing, the spare tire bracket is formed such that a vertical cross section thereof in the front and rear direction, is formed in a hat shape, a top portion of the spare tire bracket can hold a center of the spare tire, a front portion of the spare tire bracket is attached to the spare tire housing on a location frontward of a location on which the hook reinforcement is divided, and a rear portion of the spare tire bracket is attached to the spare tire housing at a location rearward of the location at which the hook reinforcement is divided.

Regarding the lower structure of the vehicle body rear portion according to the present invention, each of the side frames includes a frame front portion and a frame rear portion which are obtained by dividing the side frame in the front and rear direction, and a bead formed in the rear floor to protrude upward extends in the vehicle width direction along a location corresponding to a location at which the hook reinforcement is divided and also locations at which the side frames are divided.

According to the present invention, the following effects can be obtained.

The lower structure of the vehicle body rear portion according to the embodiment includes: a spare tire housing formed in a rear floor of the vehicle body rear portion; a rear cross member which joins paired side frames located respectively on a left side and a right side in a vehicle width direction, and which is provided at a location frontward of the spare tire housing; a hook reinforcement for a tow hook, the hook reinforcement extending in a vehicle front and rear direction and arranged at a center, in the vehicle width direction, of a bottom surface of the spare tire housing; and a bumper member provided at a rear end of a vehicle body; in which a front side of the hook reinforcement is attached to the rear cross member; in which the hook reinforcement forms a closed cross section in cooperation with the rear floor and is formed such that the closed cross section is larger at a rear side than at a front side, the hook reinforcement includes a reinforcement front portion and a reinforcement rear portion which are obtained by dividing the reinforcement at a location corresponding to a center location of a spare tire housed within the spare tire housing, and an upper side of a rear end of the reinforcement rear portion is arranged below the bumper member and overlaps with the bumper member.

Accordingly, in a case in which a load that is applied to the vehicle body rear portion from a rear side toward a front side is small, the load is applied to the bumper member and is then transmitted to the hook reinforcement. In this case, the load is received by the bumper member, the hook reinforcement, and the rear cross member which has the hook reinforcement attached thereto.

On the other hand, in a case in which the load that is applied to the vehicle body rear portion from the rear side toward the front side is large such that it is impossible to withstand the load, the load is applied first to the bumper member to displace the bumper member forward. In this case, since the upper side of the rear end of the reinforcement rear portion is arranged below the bumper member and overlaps with the bumper member, the load acts on the rear end of the reinforcement rear portion downward and forward. Therefore, the rear end of the reinforcement rear portion tries to move downward and forward. On the other hand, the front end of the reinforcement rear portion tries to maintain the location thereof with the reinforcement front portion. This allows the reinforcement rear portion to make downwardly rotational movement toward the front side around a front end thereof. As a result, the rear end of the reinforcement front portion and the front end of the reinforcement rear portion are lifted up at the location at which the hook reinforcement is divided, whereby the hook reinforcement experiences deformation in which it is bent upward into a reverse V shape (hereinafter, referred to as "reverse-V-shape bend"). Since the hook reinforcement is formed to have the closed cross section which is larger at the rear side than at the front side, the rigidity of the hook reinforcement is higher at the rear side than at the front side. Therefore, the reinforcement front portion with the lower rigidity is deformed so as to rise about the attaching portion thereof to the rear cross member, whereas the reinforcement rear portion with the higher rigidity makes downward rotational movement toward the front side around the front end thereof. As a result, the reverse-V-shape bend of the hook reinforcement is further facilitated. Therefore, the forward deformation and displacement of the spare tire housing can be prevented. By such an advantageous effect, it is possible to, for example, prevent the contact of the deformed spare tire housing and rear cross member with a fuel tank, which is often arranged frontward of the spare tire housing.

In addition, since the reverse-V-shape bend of the hook reinforcement further lifts up the front or rear side of the spare tire, so that the spare tire makes rotational movement and becomes more steeply inclined. This prevents the displacement of the front end of the spare tire toward a front side of the vehicle and therefore prevents the deformation and the displacement of the spare tire housing toward the front side. Furthermore, the spare tire raised in the trunk may enter a space between the back seat and a back door, functioning as a member to absorb the load in cooperation with the deformation of the vehicle body rear portion. One example of this is as follows. The spare tire is arranged to incline while the rear side thereof is lifted up. When the vehicle receives a load from a rear side toward a front side, the rear side of the spare tire is further lifted up, so that the spare tire comes to incline more steeply and be raised due to the reverse-V-shape bend of the spare tire housing. Therefore, the forward displacement and upward and forward displacement of the spare tire can be reliably prevented.

The hook reinforcement is divided to facilitate the reverse-V-shape bend of the spare tire housing. Note, however, that such a structure of the hook reinforcement is not involved in the supporting of the spare tire and does not therefore deteriorate the effectiveness against the vibration in the vicinity of the spare tire.

Regarding the lower structure of the vehicle body rear portion according to the embodiment, the upper side of the rear end of the reinforcement rear portion protrudes farther toward a rear side of the vehicle than a lower side of the rear end of the reinforcement rear portion, the tow hook is attached to the lower side of the rear end of the reinforcement rear portion, and a rear end of the tow hook is arranged at a location, in a front and rear direction, corresponding to or rearward of a back panel at the rear end of the vehicle body. Accordingly, the tow hook is attached to the rear end of the reinforcement rear portion given the higher rigidity due to larger closed cross section thereof. Therefore, the attachment rigidity for the tow hook can be increased. In addition, the attaching of the tow hook to the rear end of the reinforcement rear portion makes the rigidity of the rear side of the hook reinforcement even higher than the rigidity of the front side of the hook reinforcement. Therefore, a reverse-V-shape bend starting at the boundary between the reinforcement front and rear portions of the hook reinforcement, is further facilitated. As a result, it is possible to prevent more efficiently the forward deformation and displacement of the spare tire housing.

Regarding the lower structure of the vehicle body rear portion according to the embodiment, a spare tire bracket to hold the spare tire is provided to a top surface of the spare tire housing, the spare tire bracket is so formed that its vertical cross section in the front and rear direction is of a hat shape, a top portion of the spare tire bracket can hold a center of the spare tire, a front portion of the spare tire bracket is attached to the spare tire housing on a location frontward of a location at which the hook reinforcement is divided, and a rear portion of the spare tire bracket is attached to the spare tire housing at a location rearward of the location at which the hook reinforcement is divided. Accordingly, the center of the spare tire is arranged at the dividing location at the hook reinforcement, which corresponds to the apex of the reverse-V-shape bend of the hook reinforcement. Accordingly, the front of rear side of the spare tire can be lifted up more readily, and therefore the spare tire can make the rotational movement to incline steeper more readily. As a result, it is possible to prevent efficiently the displacement of the front end of the spare tire toward a front side and an upper front side of the vehicle, and also to prevent efficiently the deformation and displacement of the spare tire housing and the rear cross member toward the front side.

Regarding the lower structure of the vehicle body rear portion according to the embodiment, each of the side frames includes a frame front portion and a frame rear portion obtained by dividing the side frame in the front and rear direction, and a bead formed in the rear floor to protrude upward extends in the vehicle width direction along a location corresponding to a location on which the hook reinforcement is divided and also locations on which the side frames are divided. Accordingly, each side frame can also be bent into a reverse-V-shape. In addition, the bead increasing the rigidities of the rear floor and the spare tire housing extends in the vehicle width direction, and the location of the bead corresponds, in the front and rear direction, to the dividing location on each side frame and the dividing location on the hook reinforcement. Therefore, the reverse-V-shape bend of the rear floor and the spare tire housing is further facilitated. As a result, it is possible to efficiently prevent the displacement of the spare tire toward a front side and an upper front side of the vehicle, and also to prevent further efficiently the deformation and displacement of the spare tire housing toward the front side.

BRIEF DESCRIPTION OF THE DRAWINGS

FIG. 7 is a side view schematically showing the lower structure of the vehicle body rear portion in the case of the embodiment of the present invention.

DETAILED DESCRIPTION OF THE INVENTION

Figure 1:
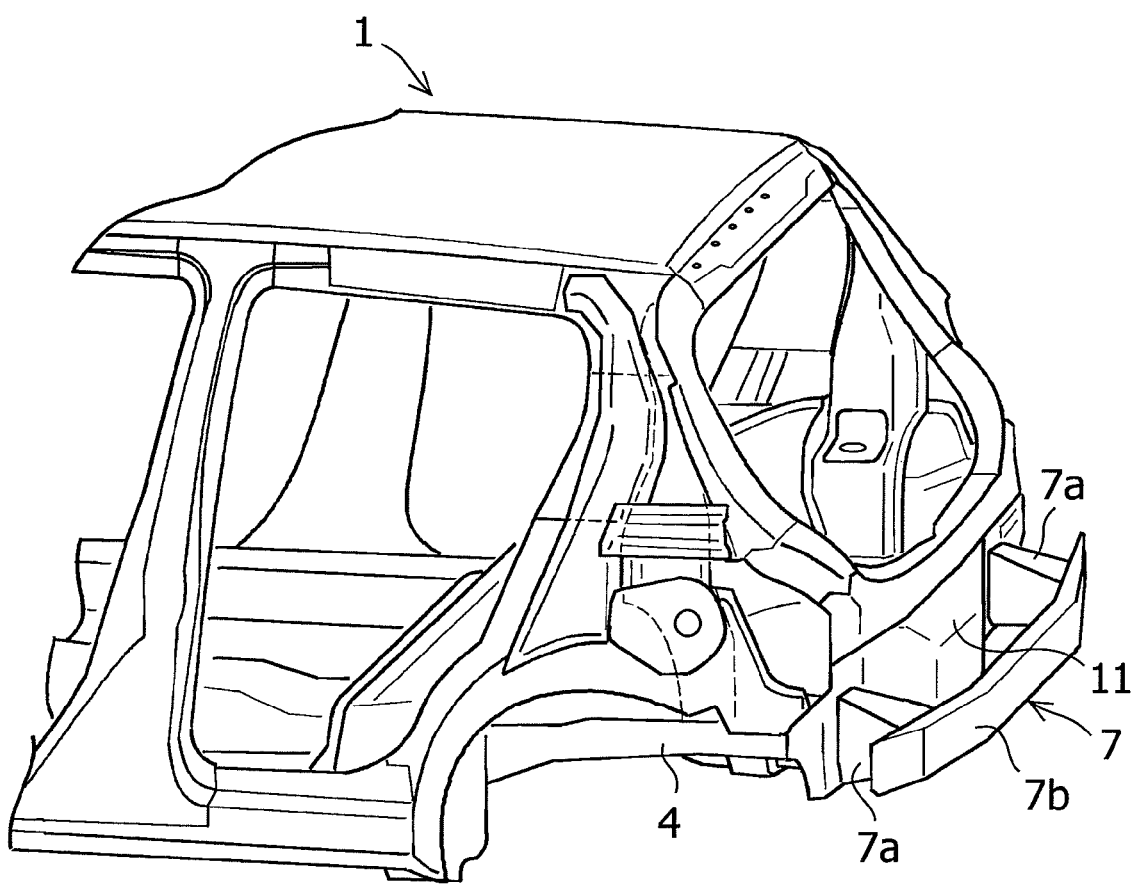
FIG. 1 is a perspective view showing a vehicle body rear portion in a vehicle to which a lower structure according to an embodiment of the present invention is applied.
Figure 2:
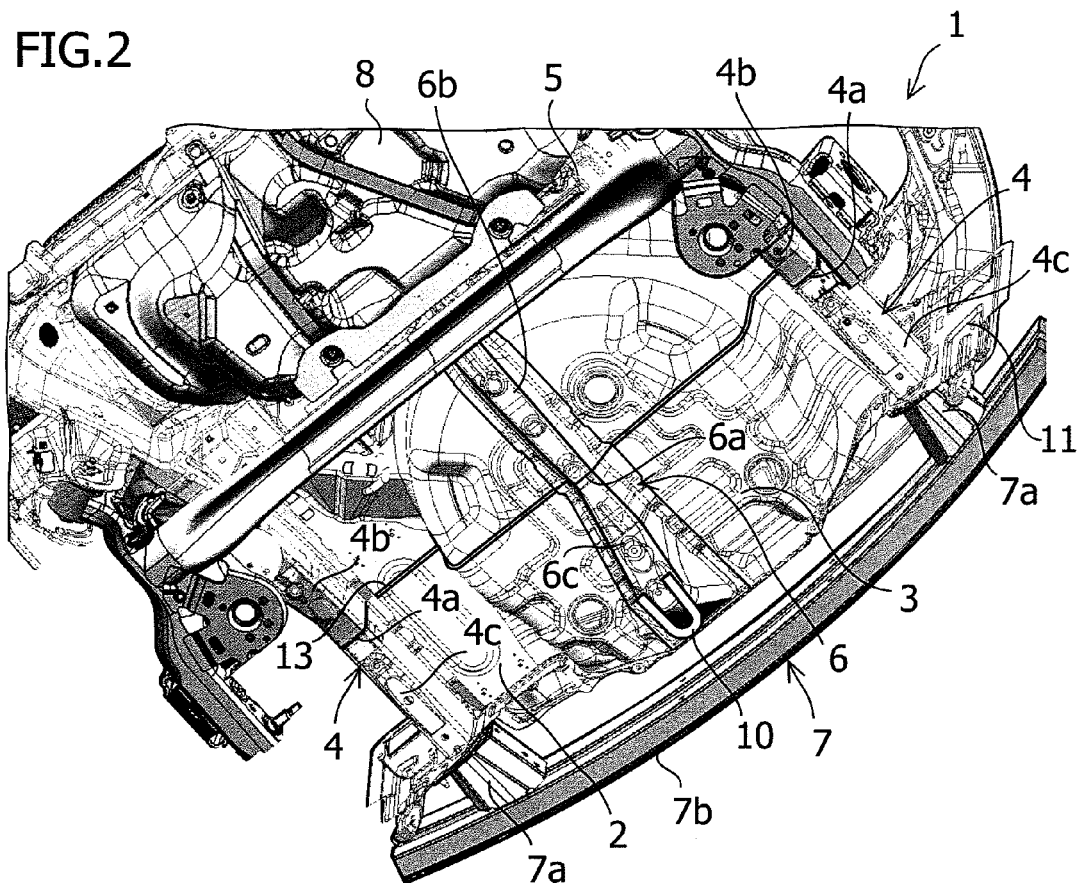
FIG. 2 is a schematic perspective view showing the external appearance of the lower structure of the vehicle body rear portion in the case of the embodiment of the present invention.
Figure 3:
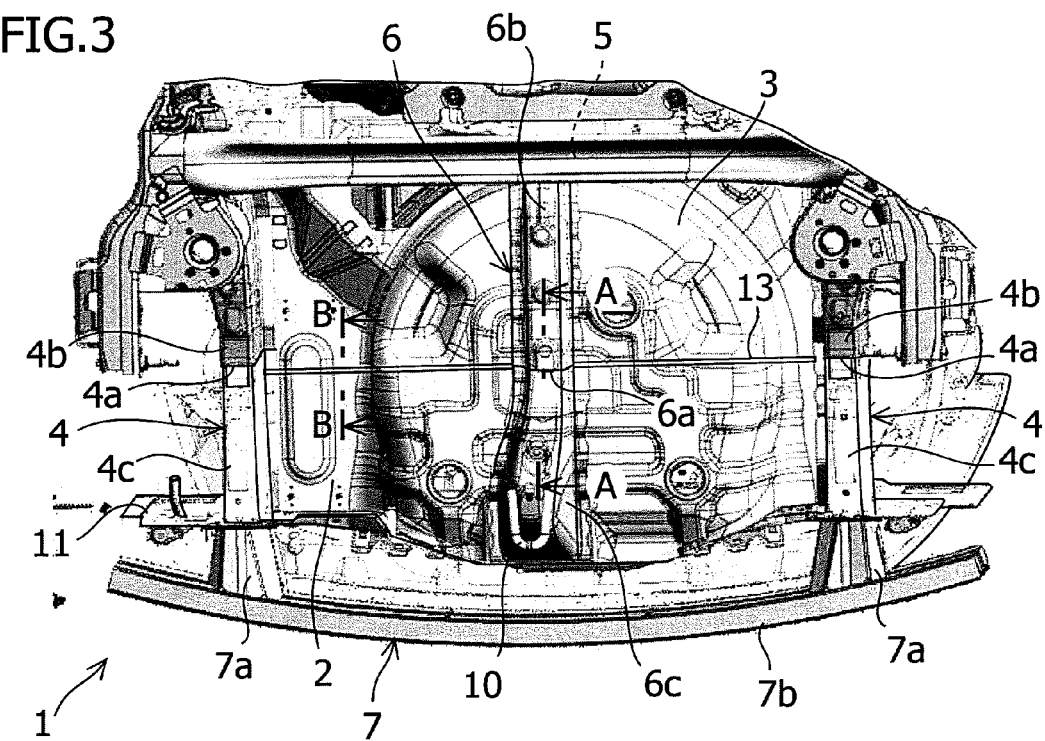
FIG. 3 is a schematic bottom view of the lower structure of the vehicle body rear portion in the case of the embodiment of the present invention.
Figure 4:
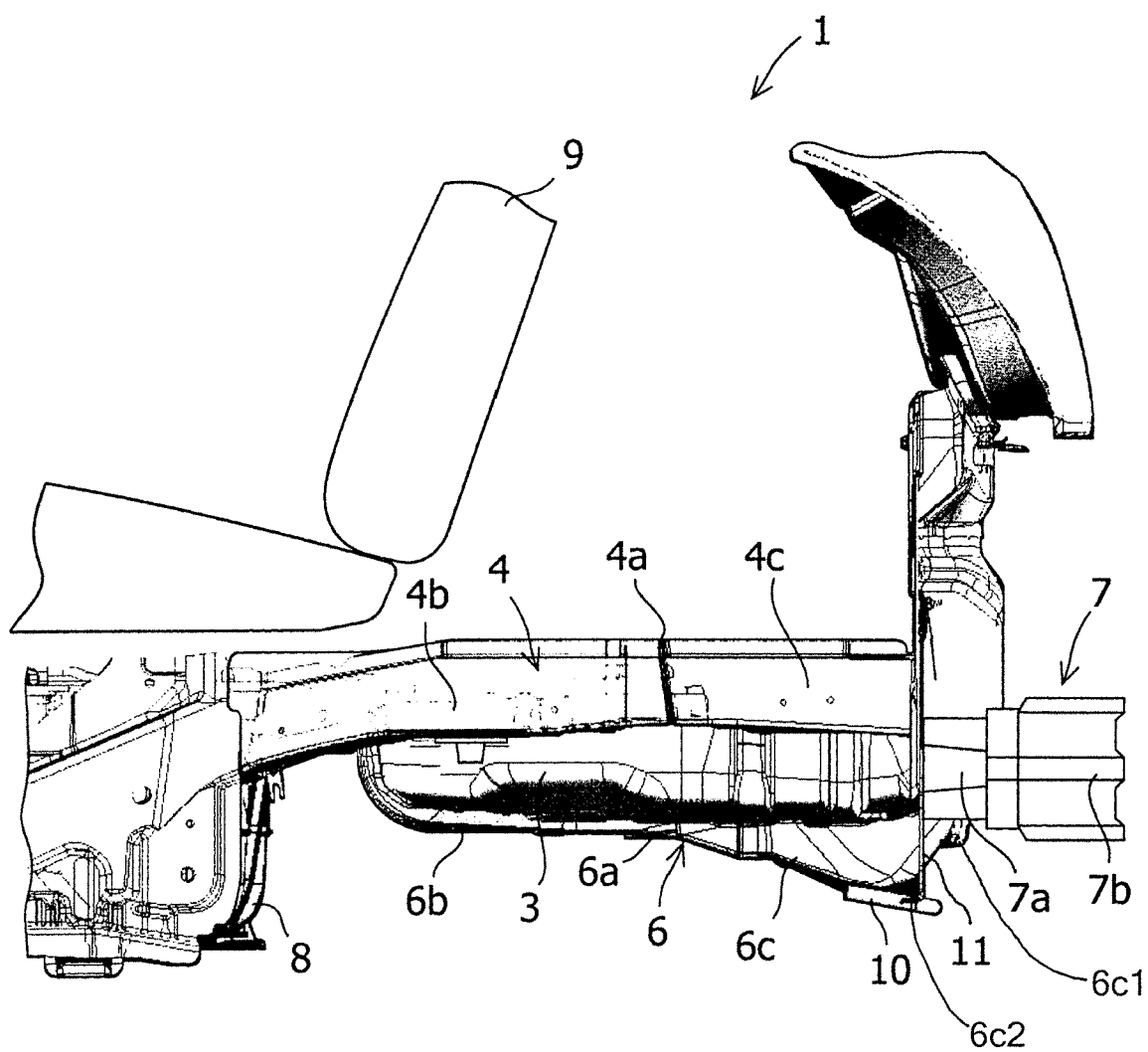
FIG. 4 is a schematic side view of the lower structure of the vehicle body rear portion in the case of the embodiment of the present invention.

Hereinbelow, a lower structure of a vehicle body rear portion according to an embodiment of the present invention will be described. In the embodiments of the present invention, description will be given using a hatchback vehicle. However, the vehicle may be of some other type such as a sedan, coupe, hardtop, SUV, station wagon, or minivan as long as the structure thereof can obtain the same advantageous effects as the present invention provides.

As shown in FIGS. 1 to 4, a rear floor 2 expanding horizontally is provided to a vehicle body rear portion 1 in the embodiment. In a center portion of the rear floor 2, there is formed a spare tire housing 3 having a shape diminishing in size and recessed downward to house and lay a spare tire S (see FIG. 7(a)). On both left and right ends of the rear floor 2 in the vehicle width direction, side frames 4, extending in the front and rear direction, are arranged, respectively. The rear floor 2 and the side frames 4 are welded to each other. A rear cross member 5 joining these paired side frames 4 together is arranged on the bottom surface side of the rear floor 2 on a location forward of the spare tire housing 3. In addition, a hook reinforcement 6 extending in the vehicle front and rear direction is arranged on a bottom surface of the spare tire housing 3 on a center location thereof in the vehicle width direction. A bumper member 7 is provided at the rear end of the vehicle body rear portion 1. Therefore, the lower structure of the vehicle body rear portion 1 according to the embodiment includes the rear floor 2, the spare tire housing 3, the side frames 4, the rear cross member 5, the hook reinforcement 6, and the bumper member 7.

Furthermore, a fuel tank 8 is provided at the bottom surface side of the rear floor 2 at a location forward of the spare tire housing 3, and rear seats 9 are arranged on the top surface side of the rear floor 2 at a location forward of the spare tire housing 3. A tow hook 10 protruding toward a rear side is provided at the rear end of the hook reinforcement 6. A back panel 11 is arranged at the rear end of the rear floor 2, and the bumper member 7 is attached to a rear surface of the back panel 11.

Figure 5:
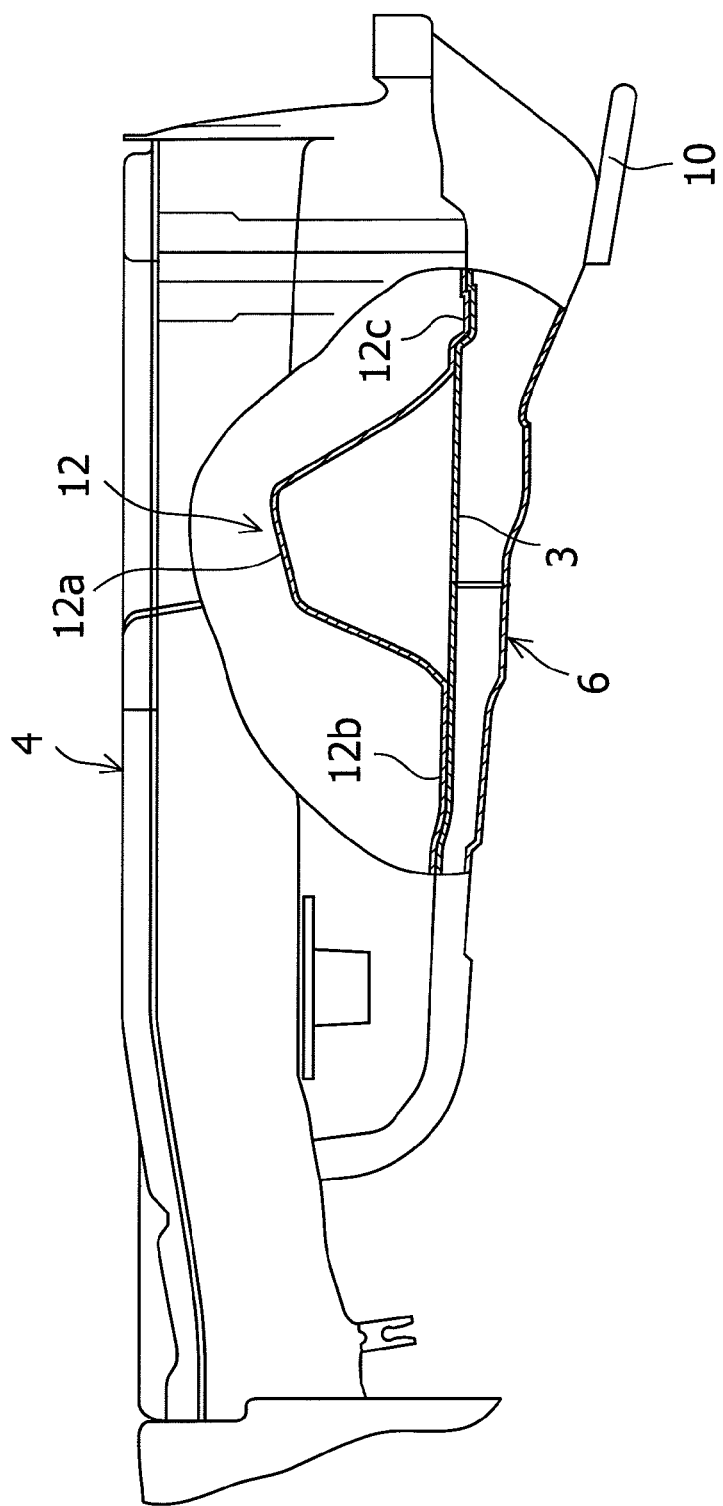
FIG. 5 is a schematic side cross-sectional view of a part of the lower structure of the vehicle body rear portion in the case of the embodiment of the present invention, and shows a cross section taken along the line A-A of FIG. 3.

Referring to FIG. 5, a spare tire bracket 12 to hold the spare tire S is provided at a top surface of the spare tire housing 3.

This spare tire bracket 12 is formed such that a cross section thereof in the front and rear direction is formed in a hat shape. A top portion 12a of the hat-shaped spare tire bracket 12 is configured to be able to hold the center of the spare tire S. Furthermore, the top portion 12a is formed to incline with its front side situated lower. The spare tire S held by the top portion 12a thereby formed is housed within the spare tire housing 3 in an inclined orientation while the rear portion thereof is lifted up (see FIG. 7(a)). A front portion 12b of the hat-shaped spare tire bracket 12 is attached to the spare tire housing 3 at a location forward of the center location of the spare tire S. Furthermore, a rear portion 12c of the spare tire bracket 12 is attached to the spare tire housing 3 at a location rearward of the center location of the spare tire S.

Figure 6:
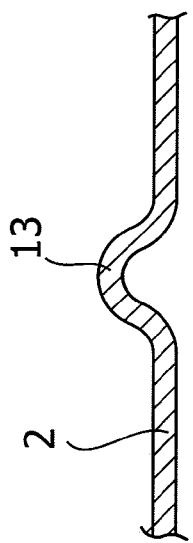
FIG. 6 is a cross-sectional view taken along the line B-B of FIG. 3.

By referring to FIGS. 1 to 4 again, the vehicle body rear portion 1 in the embodiment will be described further in detail. Each side frame 4 is divided in the front and rear direction into a frame front portion 4b and a frame rear portion 4c on a dividing location 4a. The hook reinforcement 6 forms a closed cross section in cooperation with the spare tire housing 3, and is formed such that the closed cross section is larger at a rear side than at a front side. In particular, the hook reinforcement 6 is formed such that the height of a closed cross section thereof becomes larger gradually from the front side to the rear side and that the width of the closed cross section becomes larger gradually from the front side to the rear side. The hook reinforcement 6 is divided in the front and rear direction into a reinforcement front portion 6b and a reinforcement rear portion 6c on a dividing location 6a corresponding to the center location of the spare tire S housed in the spare tire housing 3. A bead 13 (see FIG. 6) formed in a shape protruding upward and extending in the vehicle width direction, is provided at the rear floor 2. In the front and rear direction, the location of the bead 13 corresponds to the center location of the spare tire S, the dividing location 4a of the side frame 4, and the dividing location 6a on the hook reinforcement 6.

The front end of the reinforcement front portion 6b of the hook reinforcement 6 is attached to the rear cross member 5. The rear end of the reinforcement rear portion 6c is formed such that the upper side 6c1 thereof protrudes rearward farther than the lower side 6c2 does. Furthermore, the reinforcement rear portion 6c of the hook reinforcement 6 is arranged at such a location that a portion of the bumper member 7, which is arranged higher than the hook reinforcement 6, overlaps vertically with the reinforcement rear portion 6c. The front end of the tow hook 10 protruding rearward is attached to the lower side 6c2 of the rear end part of the reinforcement rear portion 6c of the hook reinforcement 6. On the other hand, the rear end of the tow hook 10 is located on the same location as the back panel 11 or at a location rearward of the back panel 11.

The bumper member 7 includes paired bumper attaching portions 7a arranged respectively on left and right sides, in the vehicle width direction, of the bumper member 7 and protruding from a rear surface of the back panel 11 toward a rear side of the vehicle. These bumper attaching portions 7a are arranged with a space therebetween in the vehicle width direction. Furthermore, the bumper attaching portions 7a are arranged at such locations that the side frames 4 arranged higher than the bumper attaching portions 7a overlap vertically with the bumper attaching portions 7a, respectively. In other words, the bumper member 7 including the bumper attaching portions 7a is arranged between each side frame 4 arranged higher than the bumper member 7 and the reinforcement rear portion 6c of the hook reinforcement 6 arranged lower than the bumper member 7, and the bumper member 7 is arranged at such a location that the side frame 4 and the reinforcement rear portion 6c of the hook reinforcement 6 overlap vertically with the bumper member 7. Furthermore, a bumper portion 7b extending in the vehicle width direction is provided at the rear ends of the paired bumper attaching portions 7a.

In the following, by referring to FIGS. 7(a) and 7(b), description will be given of how a load F inputted to the vehicle from a rear side toward a front side affects the lower structure of the vehicle body rear portion 1 in the case of the embodiment.

Figure 7A:
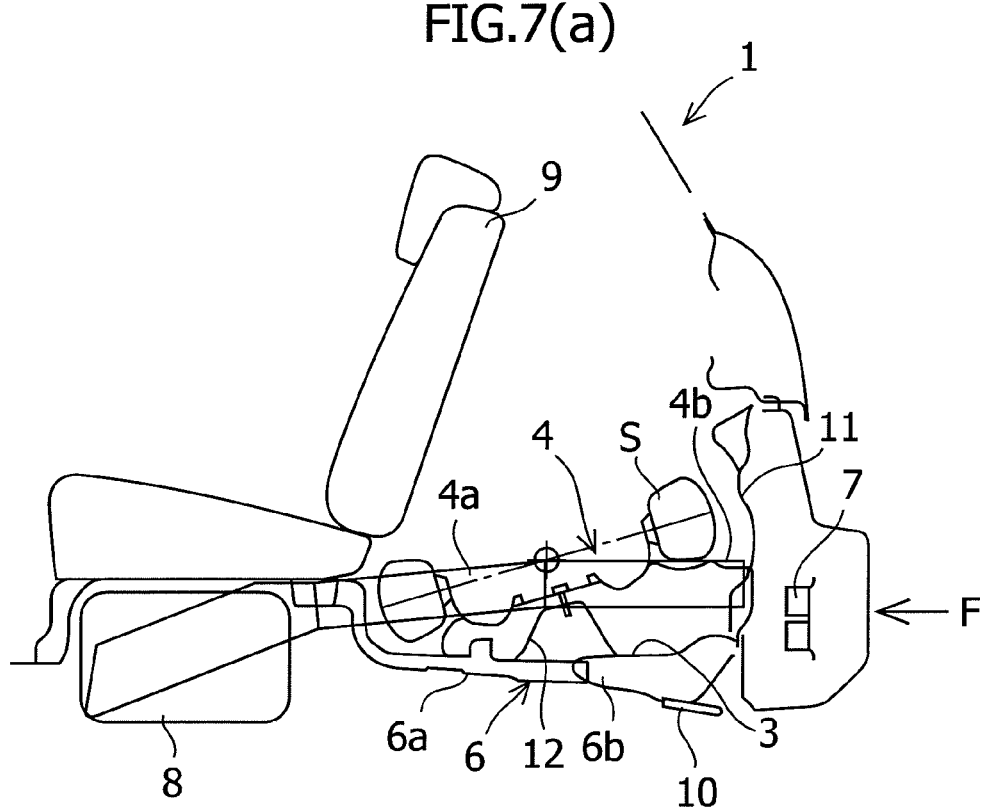
FIG. 7(a) illustrates the state of the vehicle body rear portion before the application of a load to the vehicle from a rear side toward a front side.

In a case in which the load F is small, it is applied to the bumper portion 7b of the bumper member 7 and is then transmitted to the side frames 4 and the hook reinforcement 6 by way of the bumper attaching portions 7a and the back panel 11, as shown in FIG. 7(a). In this case, the load F is received by the bumper member 7, the side frames 4, the hook reinforcement 6, and the rear cross member 5 which has the hook reinforcement 6 attached thereto.

Figure 7B:
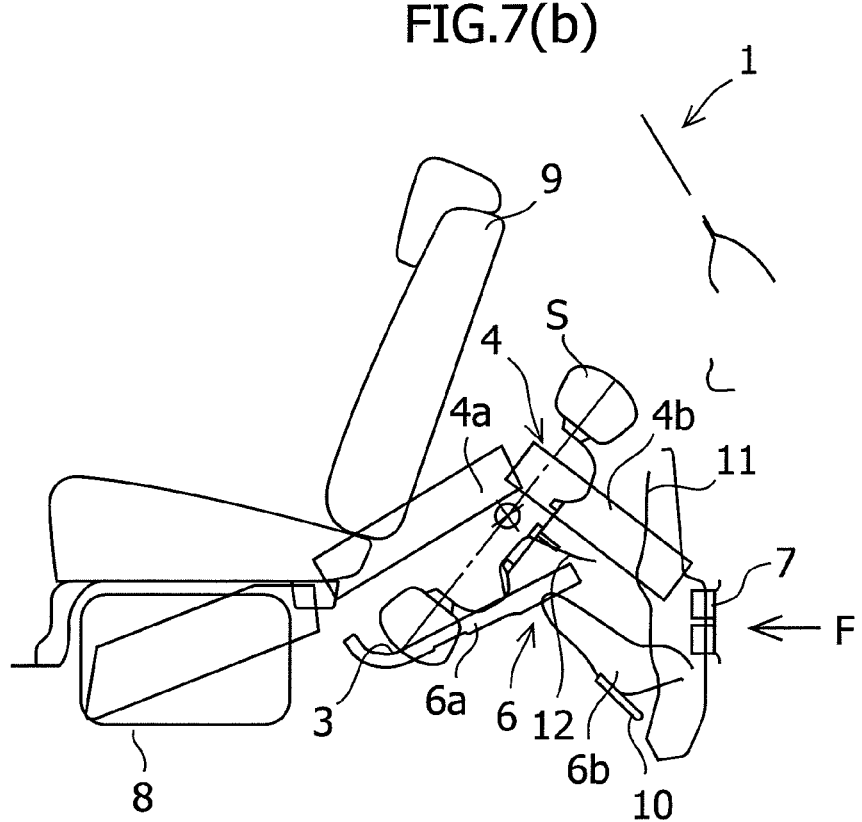
FIG. 7(b) illustrates the state of the vehicle body rear portion after the application of the load to the vehicle from the rear side toward the front side.

On the other hand, in a case in which the load F is large such that it is impossible to withstand the load F, it is applied first to the bumper portion 7b of the bumper member 7 to displace the bumper member 7 forward as shown in FIG. 7(b), and it is then transmitted to the back panel 11 through the bumper attaching portions 7a. In this case, since the upper side of the rear end of the reinforcement rear portion 6c is arranged below the bumper member 7 and overlaps with the bumper member 7, the load F transmitted to the back panel 11 acts on the rear end of the reinforcement rear portion 6c downward and forward. Therefore, the rear end of the reinforcement rear portion 6c tries to move downward and forward. On the other hand, the front end of the reinforcement rear portion 6c tries to maintain its location with the reinforcement front portion 6b. This allows the reinforcement rear portion 6c to make downward rotational movement toward the front side around the front end thereof. As a result, the rear end of the reinforcement front portion 6b and the front end of the reinforcement rear portion 6c are lifted up on the dividing location 6a on the hook reinforcement 6, whereby the hook reinforcement 6 experiences deformation in which it is bent upward into a reverse V shape (reverse-V-shape bend). Therefore, since the hook reinforcement 6 is formed to have the closed cross section which is larger at the rear side than at the front side, the rigidity of the hook reinforcement 6 is higher at the rear side than at the front side. Therefore, the reinforcement front portion 6b with the lower rigidity is deformed so as to rise around the attaching portion thereof to the rear cross member 5 whereas the reinforcement rear portion 6c with the higher rigidity makes downward rotational movement toward the front side around the front end thereof. As a result, the reverse-V-shape bend of the hook reinforcement 6 is further facilitated.

Accordingly, when the load F transmitted to the back panel 11 from the bumper member 7 is transmitted to the frame rear portion 4c of each side frame 4, the rear end of the frame front portion 4b and the front end the frame rear portion 4c are lifted up on the dividing location 4a on the side frame 4, whereby the side frame 4 is bent into a reverse-V-shape. Along with the reverse-V-shape bend of the hook reinforcement 6 and the side frames 4, the rear floor 2 and the spare tire housing 3 are bent into a reverse-V-shape along the bead 13. The reverse-V-shape bend of the spare tire housing 3 further lifts up the rear side of the spare tire S, so that the spare tire S makes rotational movement towards the front side and therefore becomes more steeply inclined.

According to the embodiment, the upper side of the rear end of the reinforcement rear portion 6c is arranged below the bumper member 7 and overlaps with the bumper member 7, and also the hook reinforcement 6 is formed such that closed cross section thereof is larger on the rear side than on the front side, as described above. This structure facilitates the reverse-V-shape bend of the spare tire housing 3 and the hook reinforcement 6 in a case in which the vehicle body rear portion 1 receives a load from a rear side toward a front side. As a result, it is possible to prevent the forward deformation and displacement of the spare tire housing 3 and therefore to prevent the contact of the deformed spare tire housing 3 and the rear cross member 5 with the fuel tank 8.

In addition, since the reverse-V-shape bend of the spare tire housing 3 and the hook reinforcement 6 further lifts up the rear side of the spare tire S and allows the spare tire S to make rotational movement towards the front side, the forward displacement of the spare tire S is prevented. This in turn avoids the contact of the front side of the spare tire S with the front side of the spare tire housing 3 and therefore further prevents the forward deformation and displacement of the spare tire housing 3. The upward and forward displacement of the spare tire S is also prevented, so that it is possible to prevent the contact of the spare tire S with the rear seats 9.

The hook reinforcement 6 is divided to facilitate the reverse-V-shape bend of the spare tire housing 3. Note, however, that such a structure of the hook reinforcement 6 is not involved in the supporting of the spare tire S and does not therefore deteriorate the effectiveness against the vibration of the spare tire S.

According to the embodiment, the tow hook 10 is attached to the rear end of the reinforcement rear portion 6c given the higher rigidity due to its larger closed cross section. Accordingly, the attachment rigidity for the tow hook 10 can be increased. In addition, the attaching of the tow hook 10 to the rear end of the reinforcement rear portion 6c makes the rigidity of the rear side of the hook reinforcement 6 even higher than the rigidity of the front side of the hook reinforcement 6. Therefore, a reverse-V-shape bend starting at the boundary between the reinforcement front and rear portions 6b and 6c of the hook reinforcement 6 is further facilitated. As a result, it is possible to prevent more efficiently the forward deformation and displacement of the spare tire housing 3.

According to the embodiment, the center of the spare tire S is arranged at the dividing location 6a at the hook reinforcement 6 that corresponds to the apex of the reverse-V-shape bend of the hook reinforcement 6. Accordingly, the rear side of the spare tire S can be lifted up more readily, and therefore the spare tire S can make the rotational movement to incline steeper more readily. As a result, it is possible to prevent efficiently the displacement of the front end of the spare tire S toward a front side and an upper front side of the vehicle, and also to prevent efficiently the deformation and displacement of the spare tire housing 3 and the rear cross member 5 toward the front side.

According to the embodiment, the bead 13 increasing the rigidities of the rear floor 2 and the spare tire housing 3 extends in the vehicle width direction, and the location of the bead 13 coincides, in the front and rear direction, with the dividing location 4a on each side frame 4 and the dividing location 6a on the hook reinforcement 6. As a result, the reverse-V-shape bend of the rear floor 2 and the spare tire housing 3 is further facilitated. As a result, it is possible to prevent efficiently the forward displacement and upward and forward displacement of the spare tire S, and also to prevent efficiently the forward deformation and displacement of the spare tire housing 3.

Hereinabove, embodiments of the present inventions have been described, but the present invention is not limited to these above-described embodiments. Various modifications and changes can be made in accordance with the technical ideas of the present invention.

For example, as a modification of the embodiment, the top portion 12a of the hat-shaped spare tire bracket 12 can be formed to incline with its front side up, and the spare tire S held by this top portion 12a can be housed within the spare tire housing 3 in an inclined orientation while the front side thereof is lifted up. Such a configuration can also yield the same advantageous effects as those of the embodiment.

What is claimed is:

1. A lower structure of a vehicle body rear portion of a vehicle body, comprising:
   a pair of side frames spaced apart from each other in a vehicle width direction;
   a spare tire housing formed in a rear floor of the vehicle body rear portion, and arranged between the pair of side frames;
   a rear cross member which joins the pair of side frames, and which is arranged at a location forward of the spare tire housing;
   a hook reinforcement for a tow hook, extending in a vehicle front and rear direction and being arranged at a center, in the vehicle width direction, of a bottom surface of the spare tire housing; and
   a bumper member provided at a rear end of the vehicle body;
   wherein a front end of the hook reinforcement is attached to the rear cross member;
   wherein the hook reinforcement forms a closed cross section in cooperation with the rear floor;
   wherein the closed cross section becomes larger along a vehicle longitudinal direction from a vehicle front end to a vehicle rear end;
   wherein the hook reinforcement includes a reinforcement front portion which is arranged rearward, with respect to the vehicle longitudinal direction, of the rear cross member, and a reinforcement rear portion which is arranged rearward relative to the reinforcement front portion, a rear end of the reinforcement front portion being connected to a front end of the reinforcement rear portion at a connecting part therebetween, the connecting part being arranged so as to correspond to a center location, with respect to the vehicle longitudinal direction, of a spare tire housed within the spare tire housing; and
   wherein an upper side of a rear end of the reinforcement rear portion is arranged below a portion of the bumper member and is overlapped by said portion of the bumper member as seen along the vehicle width direction from a side surface of the vehicle.

2. The lower structure of the vehicle body rear portion according to claim 1, further comprising a back panel at the rear end of the vehicle body and extending along the vehicle width direction, and wherein
   the upper side of the rear end of the reinforcement rear portion protrudes farther toward the rear end of the vehicle than a lower side of the rear end of the reinforcement rear portion,
   the tow hook is attached to the lower side of the rear end of the reinforcement rear portion, and
   a rear end of the tow hook extends rearward of the back panel at the rear end of the vehicle body.

3. The lower structure of the vehicle body rear portion according to claim 1, wherein
   a spare tire bracket to hold the spare tire is provided at a top surface of the spare tire housing, the spare tire bracket has a cross section in a vertical plane extending in the vehicle longitudinal direction that is formed in a hat shape,
a top portion of the spare tire bracket can hold a center of the spare tire,
a front portion of the spare tire bracket is attached to the spare tire housing at a location forward, with respect to the vehicle longitudinal direction, of the connecting part between the reinforcement front portion and the reinforcement rear portion, and
a rear portion of the spare tire bracket is attached to the spare tire housing at a location rearward, with respect to the vehicle longitudinal direction, of the connecting part between the reinforcement front portion and the reinforcement rear portion.

4. The lower structure of the vehicle body rear portion according to claim 1, wherein each of the side frames includes a frame front portion which is arranged rearward, with respect to the vehicle longitudinal direction, of the rear cross member, and a frame rear portion which is arranged rearward of the frame front portion,
a rear end of the frame front portion of each side frame connects to a front end of the frame rear portion of the side frame at a connecting part therebetween, and
a bead is formed in the rear floor-to and protrudes upward and extends in the vehicle width direction at a location, with respect to the vehicle longitudinal direction, corresponding to the connecting part between the reinforcement front portion and the reinforcement rear portion and to the connecting parts between the frame front portions and the frame rear portions.

\* \* \* \* \*

UNITED STATES PATENT AND TRADEMARK OFFICE
CERTIFICATE OF CORRECTION

PATENT NO. : 8,303,015 B2
APPLICATION NO. : 12/974316
DATED : November 6, 2012
INVENTOR(S) : Souma et al.

It is certified that error appears in the above-identified patent and that said Letters Patent is hereby corrected as shown below:

Column 12,
Line 9, "floor-to" should read --floor--.

Signed and Sealed this
Ninth Day of April, 2013

Teresa Stanek Rea
*Acting Director of the United States Patent and Trademark Office*